US012794897B2

(12) United States Patent
Son et al.

(10) Patent No.: US 12,794,897 B2
(45) Date of Patent: Nov. 10, 2026

(54) CONTAINER ORCHESTRATION MANAGEMENT DEVICE AND METHOD OF OPERATING THE SAME

(71) Applicant: ELECTRONICS AND TELECOMMUNICATIONS RESEARCH INSTITUTE, Daejeon (KR)

(72) Inventors: Siwoon Son, Daejeon (KR); Jiwoo Han, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 53 days.

(21) Appl. No.: 19/021,031

(22) Filed: Jan. 14, 2025

(65) Prior Publication Data

US 2025/0240300 A1 Jul. 24, 2025

(30) Foreign Application Priority Data

Jan. 18, 2024 (KR) ........................ 10-2024-0008002
Sep. 4, 2024 (KR) ........................ 10-2024-0119744

(51) Int. Cl.
*H04L 9/40* (2022.01)

(52) U.S. Cl.
CPC .................................. *H04L 63/102* (2013.01)

(58) Field of Classification Search
CPC ..................................................... H04L 63/102
See application file for complete search history.

(56) References Cited

U.S. PATENT DOCUMENTS 6,801,926 B1 * 10/2004 Shisler .................... H04L 67/10
709/201
11,314,541 B2 4/2022 Singh et al.
(Continued)

FOREIGN PATENT DOCUMENTS

JP 2023-146844 A 10/2023
KR 10-2016-0121982 10/2016
(Continued)

*Primary Examiner* — Nicholas R Taylor
*Assistant Examiner* — Tania M Pena-Santana

(57) ABSTRACT

Disclosed is a container orchestration management device including an application template managing device that creates first execution information including a container image, which are required for deployment of a first application, as a first template based on a request signal of a first user including the first execution information, creates second execution information including a container image, which are required for deployment of a second application, as a second template based on a request signal of the first user including the second execution information, and manages the first template and the second template, a daemon application managing device that creates the first application through container orchestration, continuously executes the first application, and deploys and manages the first application, based on the first template, and a batch application managing device that creates the second application through the container orchestration, and manages the second application, based on the second template.

11 Claims, 6 Drawing Sheets

(56) References Cited

U.S. PATENT DOCUMENTS

| | | | | |
|---|---|---|---|---|
| 2002/0004824 | A1* | 1/2002 | Cuan | H04L 67/34 709/208 |
| 2015/0142878 | A1 | 5/2015 | Hebert et al. | |
| 2020/0186441 | A1* | 6/2020 | Fitzer | G06F 40/205 |
| 2020/0379794 | A1 | 12/2020 | Kim | |
| 2021/0382997 | A1 | 12/2021 | Yi et al. | |
| 2022/0398119 | A1 | 12/2022 | Kim et al. | |
| 2023/0169168 | A1* | 6/2023 | Magen Medina | G06F 9/45558 726/23 |
| 2023/0315888 | A1 | 10/2023 | Ishida et al. | |
| 2024/0168761 | A1* | 5/2024 | Coviello | G06F 9/5083 |

FOREIGN PATENT DOCUMENTS

| | | | |
|---|---|---|---|
| KR | 10-1807806 | B1 | 12/2017 |
| KR | 10-1952573 | B1 | 2/2019 |
| KR | 10-2591865 | B1 | 10/2023 |

* cited by examiner

CONTAINER ORCHESTRATION MANAGEMENT DEVICE AND METHOD OF OPERATING THE SAME

CROSS-REFERENCE TO RELATED APPLICATIONS

This application claims priority under 35 U.S.C. § 119 to Korean Patent Application No. 10-2024-0008002 filed on Jan. 18, 2024, and No. 10-2024-0119744 filed on Sep. 4, 2024, in the Korean Intellectual Property Office, the disclosures of which are incorporated by reference herein in their entireties.

BACKGROUND

Embodiments of the present disclosure described herein relate to an electronic device, and more particularly, relate to a container orchestration management device that manages container orchestration.

A cloud computing technology refers to a technology that virtualizes all computing infrastructure resources such as CPU, memory, storage, network, or the like based on virtualization technology, and then provides the virtualized resources as many as needed at the request of a user.

Nowadays, as the virtualization technology has evolved, a container technology has emerged in which applications and libraries, binaries, and configuration files, which are required to execute the applications, are packaged and deployed separately from the operating system, without emulating the entire computer in software or hardware. Applications containerized through the container technology may be easily moved between different environments (development, test, production, etc.). Moreover, to maximize this convenience, applications are being developed based on microservice architecture.

Accordingly, container orchestration software platforms have emerged to easily deploy and manage many microservice architecture-based containerized applications. The container orchestration software platforms are being applied to cloud environments and widely used in various environments. Representative container orchestration software platforms include Kubernetes, Docker Swarm, and Apache Mesos.

Despite these various advantages, it is complicated for general users to set up container orchestration, and it is difficult to share applications on the container orchestration.

SUMMARY

Embodiments of the present disclosure provide a device that provides convenience in deploying applications through container orchestration.

According to an embodiment, a container orchestration management device includes an application template managing device that creates first execution information including a container image, a computing resource, an environment variable, an execution command, an argument, and a service port, which are required for deployment of a first application, as a first template based on a request signal of a first user including the first execution information, creates second execution information including a container image, an environment variable, an execution command, an argument, and a service port, which are required for deployment of a second application, as a second template based on a request signal of the first user including the second execution information, and manages the first template and the second template, a daemon application managing device that creates the first application through container orchestration, continuously executes the first application, and deploys and manages the first application, based on the first template, and a batch application managing device that creates the second application through the container orchestration, temporarily executes the second application, deploys the second application, and manages the second application, based on the second template.

In some embodiments for solving the above-described problems, the container orchestration management device further include a data storage device that stores information related to the application template managing device, the daemon application managing device, and the batch application managing device, and first user information including an ID, a password, a name, and an email address of the first user.

In some embodiments for solving the above-described problems, the container orchestration management device further includes a system user managing device that adds second user information including a second access permission of a second user, and a ID, a password, a name, and an email address of the second user to the data storage device, manages the first user information and the second user information stored in the data storage device, and determines validity of the second access permission based on a request signal of the second user.

In some embodiments for solving the above-described problems, the container orchestration management device further includes a container orchestration managing device that identifies an execution status of the first application and an execution status of the second application from the container orchestration, and executes, deploys, and manages the first application and the second application through the container orchestration based on request signals of the daemon application managing device and the batch application managing device.

In some embodiments for solving the above-described problems, the data storage device includes a system user storage device that stores the first user information, the second user information, an access permission of the first user, and the access permission of the second user, an application template information storage device that stores template information including names, descriptions, and computing resources for the first template and the second template, a daemon application information storage device that stores first application information including a name, a description, and an operating status of the first application, and a batch application information storage device that stores second application information including a name, a description, and an operating status of the second application.

In some embodiments for solving the above-described problems, the system user managing device includes a user adding device that adds the second access permission and the second user information to the data storage device, a user modifying device that modifies the second user information, a user deleting device that deletes the second access permission and the second user information from the data storage device, and a user inquiring device that determines validity of the second access permission based on a request of the second user.

In some embodiments for solving the above-described problems, the application template managing device includes an application template adding device that creates the first template and the second template based on a request signal of the first user, an application template modifying device that modifies the first execution information and the second execution information of the first template and the second template, an application template deleting device that deletes the first template or the second template from the data storage device, an application template publicizing device that publicizes the first template to the second user, and an application template inquiring device that outputs the first template based on an access request of the second user for the first template.

In some embodiments for solving the above-described problems, the daemon application managing device includes a daemon application adding device that creates the first application based on the first template, a daemon application modifying device that modifies the first application, a daemon application deleting device that deletes the first application, a daemon application inquiring device that receives the execution status of the first application from the container orchestration managing device and outputs the execution status of the first application, a daemon application executing device that creates, continuously executes, and deploys the first application through the container orchestration managing device, and a daemon application access device that allows a third user to access the first application.

In some embodiments for solving the above-described problems, the batch application managing device includes a batch application adding device that creates the second application based on the second template, a batch application modifying device that modifies the second application, a batch application deleting device that deletes the second application, a batch application inquiring device that receives the execution status of the second application from the container orchestration managing device and outputs the execution status of the second application, and a batch application executing device that creates, temporarily executes, and deploys the second application through the container orchestration managing device.

According to an embodiment, a container orchestration managing method of a container orchestration management device including an application template managing device and a daemon application managing device includes receiving, by the application template managing device, execution information including a container image, an environment variable, an execution command, an argument, and a service port, which are required for deployment of an application, creating, by the application template managing device, a template based on the execution information, determining, by the container orchestration management device, an execution method of the application based on a user execution request, and creating, continuously executing, and deploying, by the daemon application managing device, the application through the template based on determining that the execution method of the application is a daemon method.

In some embodiments for solving the above-described problems, the container orchestration management device further includes a batch application managing device. The container orchestration managing method further includes creating, temporarily executing, and deploying, by the batch application managing device, the application through the template based on determining that the execution method of the application is a batch method.

In some embodiments for solving the above-described problems, the container orchestration management device further includes stopping, by the daemon application managing device, the deployment of the application based on a request of the user to stop the application.

BRIEF DESCRIPTION OF THE FIGURES

The above and other objects and features of the present disclosure will become apparent by describing in detail embodiments thereof with reference to the accompanying drawings.

DETAILED DESCRIPTION

The present disclosure is not limited to embodiments disclosed below, but may be implemented in many forms and subject to various modifications and changes. However, the description of the embodiments is provided to make the disclosure of the present disclosure complete and to fully disclose the scope of the present disclosure to those having ordinary skill in the art to which it belongs.

In various embodiments of the present disclosure, terms such as first, second, third, and the like are used to describe various components, but these components should not be limited by such terms. These terms are only used to distinguish one component from another component. The embodiments described herein include complementary embodiments thereof.

In the specification, the singular forms include plural forms unless particularly mentioned. The terms "comprises" and/or "comprising," when used in the specification, specify the presence of steps, operations, elements, and/or components, but do not preclude the presence or addition of one or more other steps, operations, elements, components, and/or groups thereof.

Hereinafter, embodiments of the present disclosure will be described in detail and clearly to such an extent that an ordinary one in the art easily implements the present disclosure.

Figure 1:
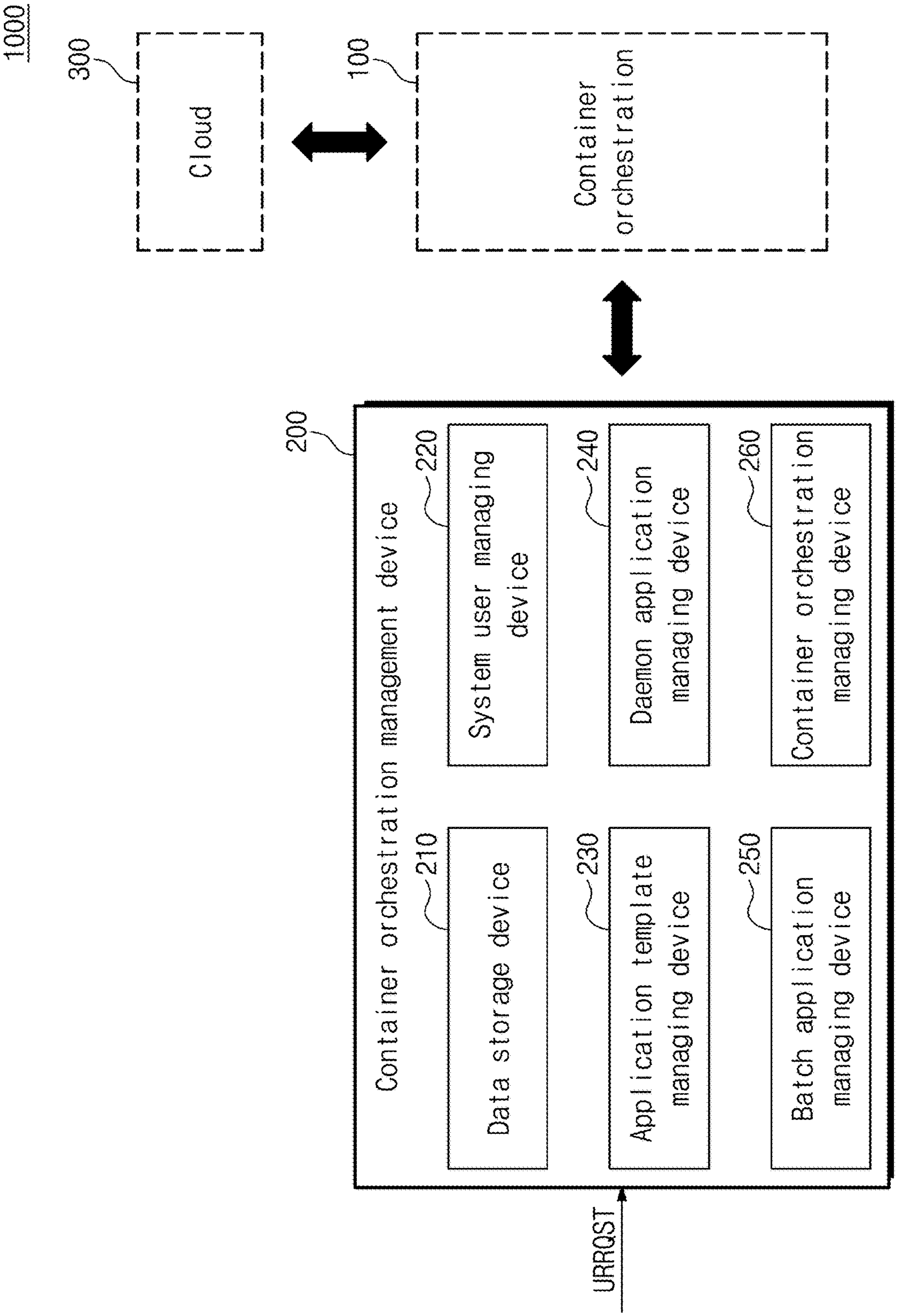
FIG. 1 is a diagram illustrating a container orchestration management system, according to an embodiment of the present disclosure.

FIG. 1 is a diagram illustrating a container orchestration management system 1000, according to an embodiment of the present disclosure.

Referring to FIG. 1, the container orchestration management system 1000 may include a container orchestration 100, a container orchestration management device 200, and a cloud 300.

The container orchestration 100 may be configured to manage and deploy applications. For example, the applications may be containerized by packaging libraries, binaries, configuration files, and the like, which are required to execute the applications. For example, the container orchestration 100 may be configured to manage and deploy the containerized applications. For example, the container orchestration 100 may group virtual machines obtained through the cloud 300 into clusters and may place containers at nodes at the request of a user. The container orchestration 100 may be configured to place, execute, and deploy the containers at the nodes.

The container orchestration management device 200 may be configured to receive a user request signal URRQST and to deploy an application through the container orchestration 100. For example, the user request signal URRQST may include execution information that is required for the container orchestration 100 to deploy applications. For example, the execution information may include container images, computing resources, environment variables, execution commands, arguments, service ports, or the like, which are required to deploy the applications. For example, the container orchestration management device 200 may be configured to receive the execution information from a user and may provide the execution information to the container orchestration 100. For example, the container orchestration management device 200 may be configured to manage the execution information and to transform the execution information so as to be suitable for a format of the container orchestration 100. For example, the container orchestration management device 200 may create a template including the execution information. For example, the container orchestration management device 200 may be configured to create, execute, and deploy applications by using the template through the container orchestration 100.

The container orchestration management device 200 may be configured to receive an execution method from a user, to create an application as a template through the container orchestration 100, and may execute it in a daemon or batch method.

For example, the container orchestration management device 200 may be configured to create, continuously execute, and deploy a daemon application as a template through the container orchestration 100 based on a user's daemon-method execution request. For example, the container orchestration 100 may be configured to execute the daemon application until a termination request of the user occurs. For example, the container orchestration management device 200 may be configured to receive the termination request of the user and to terminate the execution of the daemon application through the container orchestration 100.

For example, the container orchestration management device 200 may be configured to create, temporarily execute, and deploy a batch application as a template through the container orchestration 100 based on the user's batch-method execution request. For example, a batch application may be executed with an end time point. For example, the batch application may be collectively executed depending on the set time or condition. For example, the container orchestration management device 200 may be configured to receive the termination request of the user and to terminate the execution of the batch application through the container orchestration 100.

The container orchestration management device 200 may include a data storage device 210, a system user managing device 220, an application template managing device 230, a daemon application managing device 240, a batch application managing device 250, and a container orchestration managing device 260.

The data storage device 210 may be configured to store information required for the container orchestration management device 200. Detailed descriptions of the data storage device 210 will be described later with reference to FIG. 2.

The system user managing device 220 may be configured to manage user information accessible to the container orchestration management device 200. Detailed descriptions of the system user managing device 220 will be described later with reference to FIG. 3.

The application template managing device 230 may be configured to manage templates. Detailed descriptions of the application template managing device 230 will be described later with reference to FIG. 4.

The daemon application managing device 240 may be configured to create, continuously execute, deploy, and manage the daemon application based on the template. Detailed descriptions of the daemon application managing device 240 will be described later with reference to FIG. 5.

The batch application managing device 250 may be configured to create, temporarily execute, deploy, and manage the batch application based on the template. Detailed descriptions of the batch application managing device 250 will be described later with reference to FIG. 6.

The container orchestration managing device 260 may be configured to manage the container orchestration 100. Detailed descriptions of the container orchestration managing device 260 will be described later with reference to FIG. 7.

With this configuration, a container orchestration management device may create templates through execution information including container images, computing resources, environment variables, execution commands, arguments, service ports, and the like required to deploy applications, may perform management such as adding, modifying, and deleting the templates, and may deploy and manage the applications running through the templates in a daemon or batch method through container orchestration.

Through the container orchestration management device of the present disclosure, it is possible to define execution information of an application in a new form called a template, to easily share such the template, and to divide and execute the application in a daemon method and a batch method.

Figure 2:
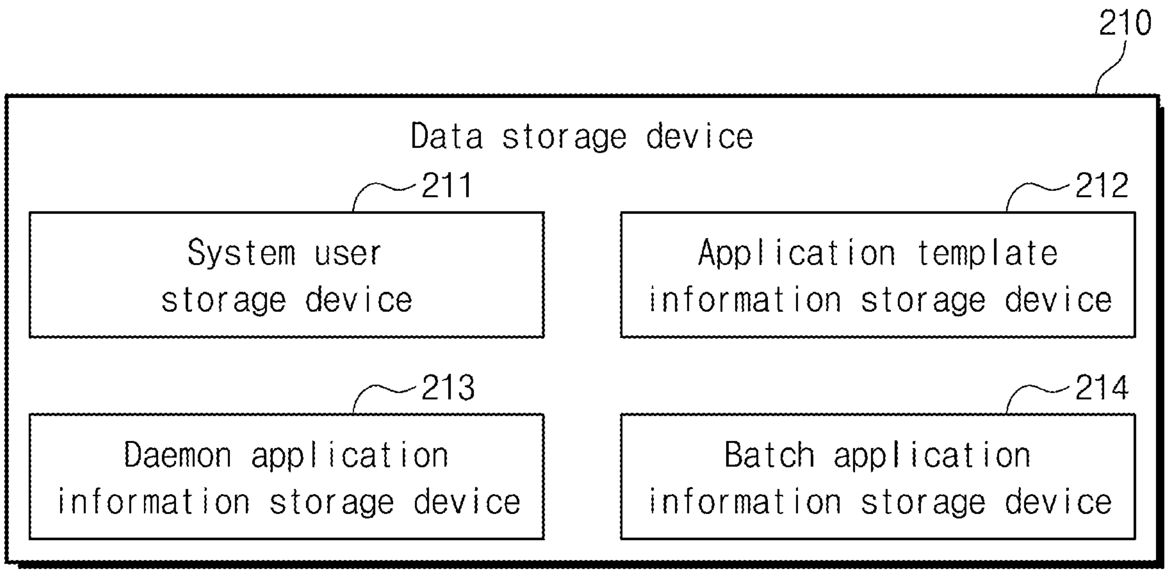
FIG. 2 is a diagram illustrating a data storage device, which is a configuration of a container orchestration management device, according to an embodiment of the present disclosure.

FIG. 2 is a diagram illustrating the data storage device 210, which is a configuration of the container orchestration management device 200, according to an embodiment of the present disclosure. Hereinafter, the description will be given with reference to FIG. 1.

The data storage device 210 may include a system user storage device 211, an application template information storage device 212, a daemon application information storage device 213, and a batch application information storage device 214.

The system user storage device 211 may be configured to store user information accessible to the container orchestration management device 200. For example, the system user storage device 211 may be configured to store the user information including a user's ID, password, name, email address, or the like.

The application template information storage device 212 may be configured to store template-related information. For example, the application template information storage device 212 may be configured to store information about a template including a container image URL, a template name, descriptions, minimum computing resources (the number of required CPU cores, a required memory size, a required volume level, and the like), service port information (a protocol, an initial value, whether ingress is linked, and the like), environment variables (a plain text key-value, a secret key-value, and the like), execution commands, arguments, and the like.

The daemon application information storage device 213 may be configured to store daemon application-related information. For example, the daemon application information storage device 213 may be configured to store daemon application-related information, including a daemon application's name, descriptions, execution status, Namespace, execution request computing resources, execution-limited computing resources, volume mount information (a mount path or persistent volume claim), service ports (a protocol, a port value, an ingress address, and the like), environment variables (a plain text key-value, a secret key-value, and the like), execution commands, arguments, execution date, and the like. For example, the execution status of the daemon application may include whether the daemon application is in one of the following states: 'not running', 'waiting', 'running', 'error', or 'unknown'. For example, the execution request computing resources may include the minimum number of CPU cores, memory size, and the like, which are required for the daemon application to be executed. For example, the execution-limited computing resources may include the maximum number of CPU cores, which are capable of being used by the daemon application, a memory size, or the like.

The batch application information storage device 214 may be configured to store batch application-related information. For example, the batch application information storage device 214 may be configured to store batch application-related information, including a batch application's name, descriptions, execution status, Namespace, execution request computing resources, execution-limited computing resources, volume mount information (a mount path or persistent volume claim), service ports (a protocol, a port value, an ingress address, and the like), environment variables (a plain text key-value, a secret key-value, and the like), execution commands, arguments, execution date, and the like. For example, the execution status of the batch application may include whether the batch application is in one of the following states: 'not running', 'waiting', 'running', 'successful', 'failed', or 'unknown'. For example, the execution request computing resources may include the minimum number of CPU cores, memory size, and the like, which are required for the batch application to be executed. For example, the execution-limited computing resources may include the maximum number of CPU cores, which are capable of being used by the batch application, a memory size, or the like.

Figure 3:
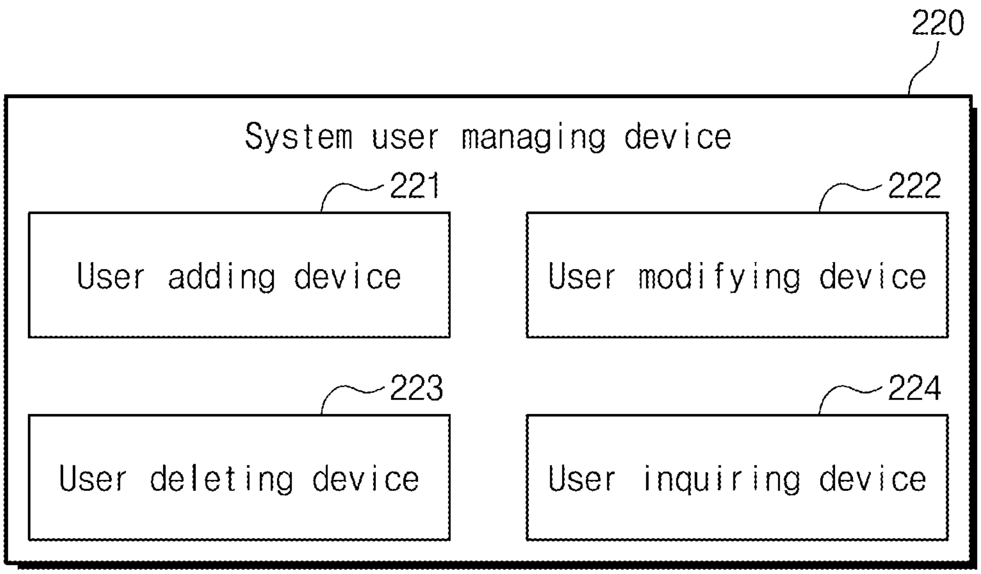
FIG. 3 is a diagram illustrating a system user managing device, which is a configuration of a container orchestration management device, according to an embodiment of the present disclosure.

FIG. 3 is a diagram illustrating the system user managing device 220, which is a configuration of the container orchestration management device 200, according to an embodiment of the present disclosure. Hereinafter, this will be described with reference to FIGS. 1 and 2.

The system user managing device 220 may include a user adding device 221, a user modifying device 222, a user deleting device 223, and a user inquiring device 224.

The user adding device 221 may be configured to add a user accessible to the container orchestration management device 200. For example, the user adding device 221 may be configured to store the access permission for a new user in the system user storage device 211. For example, the user adding device 221 may be configured to receive the new user's ID, password, name, email address, and the like and may store them in the system user storage device 211.

The user modifying device 222 may be configured to modify user information stored in the system user storage device 211. For example, the user modifying device 222 may be configured to modify the ID, password, name, email address, etc. of users stored in the system user storage device 211.

The user deleting device 223 may be configured to delete the user information stored in the system user storage device 211. For example, the user deleting device 223 may be configured to delete access permission for a user from the system user storage device 211. For example, the user deleting device 223 may be configured to collectively delete information of users, whose access permission has been deleted, such as a user's ID, password, name, email address, and the like from the system user storage device 211.

The user inquiring device 224 may be configured to determine the validity of a user's access permission based on a request signal from the user. For example, the user inquiring device 224 may be configured to determine whether a first user's access permission is stored in the system user storage device 211, based on a request signal from the first user. For example, when the access permission of the first user is stored in the system user storage device 211, the user inquiring device 224 may be configured to determine that the first user's request signal is valid access.

Figure 4:
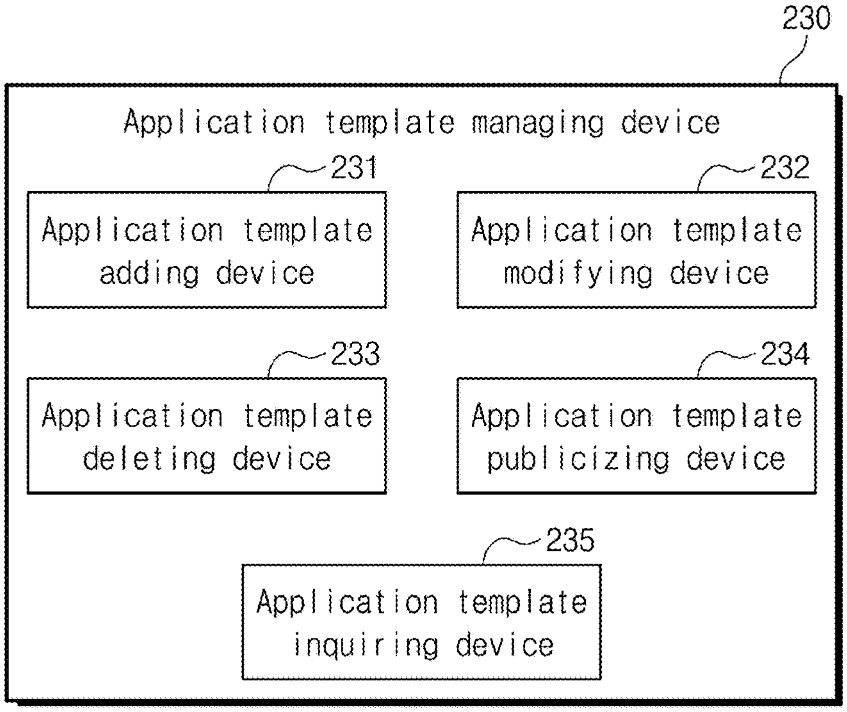
FIG. 4 is a diagram illustrating an application template managing device, which is a configuration of a container orchestration management device, according to an embodiment of the present disclosure.

FIG. 4 is a diagram illustrating the application template managing device 230, which is a configuration of the container orchestration management device 200, according to an embodiment of the present disclosure. Hereinafter, this will be described with reference to FIGS. 1 and 2.

The application template managing device 230 may include an application template adding device 231, an application template modifying device 232, an application template deleting device 233, an application template publicizing device 234, and an application template inquiring device 235.

The application template adding device 231 may be configured to create a template based on a user's request signal. The application template adding device 231 may be configured to store the created template in the application template information storage device 212. For example, the application template adding device 231 may be configured to receive execution information necessary for deploying an application and to create a template. For example, the execution information may include information, required for the application to be executed in the container orchestration 100. For example, the execution information may include container images, computing resources, environment variables, execution commands, arguments, service ports, or the like, which are required to deploy the applications.

The application template modifying device 232 may be configured to modify information about a template stored in the application template information storage device 212. For example, the application template modifying device 232 may be configured to modify execution information of a template stored in the application template information storage device 212. For example, the application template modifying device 232 may be configured to modify container images, computing resources, environment variables, execution commands, arguments, a service port, and the like of the template stored in the application template information storage device 212.

The application template deleting device 233 may be configured to delete the template stored in the application template information storage device 212.

The application template publicizing device 234 may be configured to publicize the template stored in the application template information storage device 212. For example, the application template adding device 231 may generate a first template based on the request signal of a first user. For example, the application template publicizing device 234 may be configured to publicize the first template to the second user based on a publicizing request signal of the first user. For example, the second user may be a user accessible to the container orchestration management device 200.

The application template inquiring device 235 may be configured to inquire the publicized template. For example, the application template inquiring device 235 may be configured to output the publicized first template based on a second user's access request for the first template. For example, the second user may execute and deploy the first template through the container orchestration management device 200.

Figure 5:
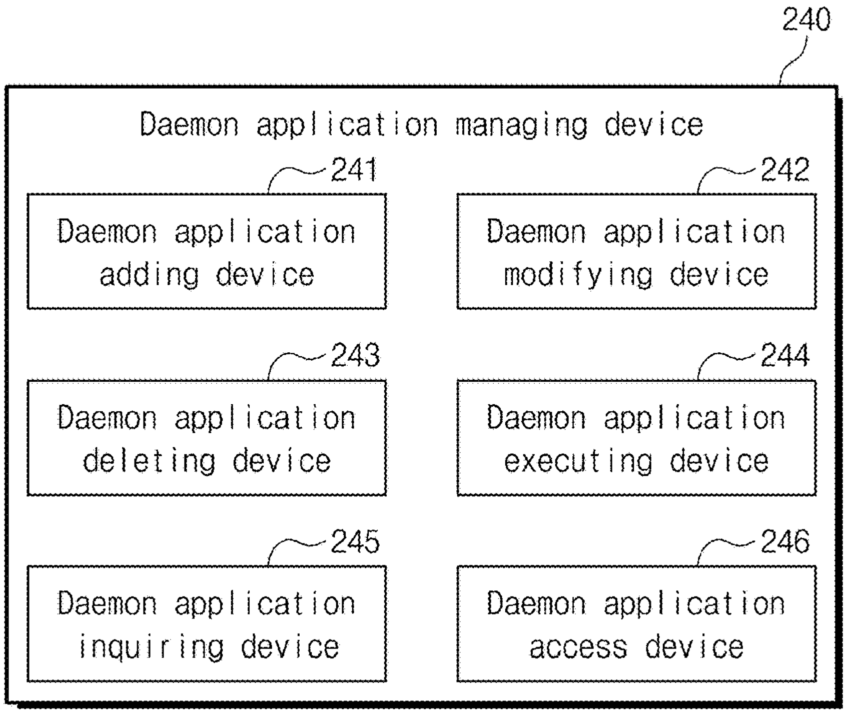
FIG. 5 is a diagram illustrating a daemon application managing device, which is a configuration of a container orchestration management device, according to an embodiment of the present disclosure.

FIG. 5 is a diagram illustrating the daemon application managing device 240, which is a configuration of the container orchestration management device 200, according to an embodiment of the present disclosure. Hereinafter, this will be described with reference to FIGS. 1, 2, and 4.

The daemon application managing device 240 may include a daemon application adding device 241, a daemon application modifying device 242, a daemon application deleting device 243, a daemon application executing device 244, a daemon application inquiring device 245, and a daemon application access device 246.

The daemon application adding device 241 may be configured to create a daemon application based on a template. For example, the daemon application adding device 241 may be configured to create a first application as a first template based on a user's daemon-method execution request. For example, when the daemon-method execution request of the first template from the user is present, the daemon application adding device 241 may be configured to receive the first template through the application template inquiring device 235. For example, the daemon application adding device 241 may create the first application capable of being continuously executed in the container orchestration 100 through the received first template. The daemon application adding device 241 may be configured to store the first application in the daemon application information storage device 213.

The daemon application modifying device 242 may be configured to modify information about the daemon application stored in the daemon application information storage device 213. For example, the daemon application modifying device 242 may be configured to modify information about the first template.

The daemon application deleting device 243 may be configured to delete information about the daemon application from the daemon application information storage device 213. For example, when information about the first application is deleted, the daemon application executing device 244 may stop executing and deploying the first application.

The daemon application executing device 244 may be configured to execute, deploy, and interrupt the daemon application stored in the daemon application information storage device 213. For example, the daemon application executing device 244 may be configured to continuously execute, deploy, and interrupt the first application. For example, the daemon application executing device 244 may be configured to transmit information about the first application to the container orchestration managing device 260. For example, the information about the first application may include information about the first template. The container orchestration managing device 260 may be configured to continuously execute, deploy, and interrupt the first application through the container orchestration 100 based on the information about the first application. Detailed descriptions of a process in which the container orchestration managing device 260 executes, deploys, and interrupt the first application will be described later with reference to FIG. 7.

The daemon application inquiring device 245 may inquire about daemon application-related information and may update and output an execution status. For example, the daemon application inquiring device 245 may inquire first application-related information from the daemon application information storage device 213. For example, the daemon application inquiring device 245 may inquire the execution status of the first application. For example, when the execution status of the daemon application is not 'not running', the daemon application inquiring device 245 may receive the execution status from the container orchestration managing device 260 and may update the execution status in the daemon application information storage device 213. For example, the daemon application inquiring device 245 may inquire that the execution status of the first application is 'running', from the daemon application information storage device 213. For example, when the daemon application inquiring device 245 receives the execution status of 'error' from the container orchestration managing device 260, the daemon application inquiring device 245 may change the execution status into 'error' and may store the execution status of 'error' in the daemon application information storage device 213. For example, when the execution status is the same, the daemon application inquiring device 245 may not perform an update operation. For example, the daemon application inquiring device 245 may output the execution status received from the container orchestration managing device 260. For example, the daemon application inquiring device 245 may output the execution status to the user based on the user's request.

The daemon application access device 246 may be configured to allow an external user to access the daemon application over a network. For example, the external user may be a user who does not have access permission for the container orchestration management device 200. For example, the daemon application access device 246 may be configured to output a URL that is accessible by the external user. Detailed descriptions of a process in which the daemon application access device 246 allows the external user to access the daemon application will be described later with reference to FIG. 7.

Figure 6:
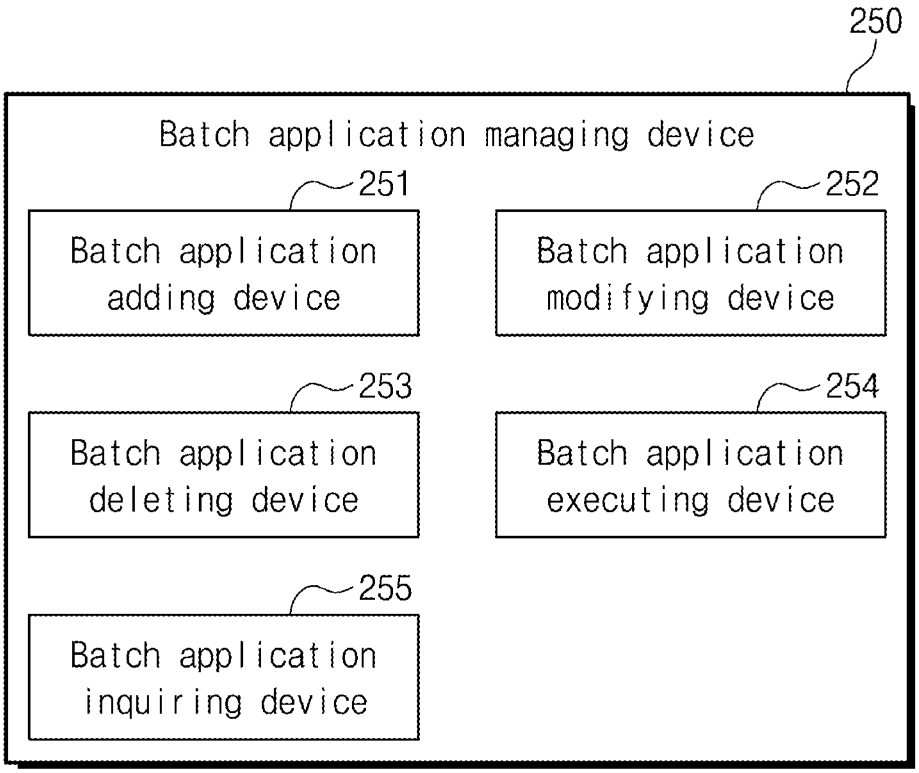
FIG. 6 is a diagram illustrating a batch application managing device, which is a configuration of a container orchestration management device, according to an embodiment of the present disclosure.

FIG. 6 is a diagram illustrating the batch application managing device 250, which is a configuration of the container orchestration management device 200, according to an embodiment of the present disclosure. Hereinafter, this will be described with reference to FIGS. 1, 2, and 4.

The batch application managing device 250 may include a batch application adding device 251, a batch application modifying device 252, a batch application deleting device 253, a batch application executing device 254, and a batch application inquiring device 255.

The batch application adding device 251 may be configured to create a batch application based on a template. For example, the batch application adding device 251 may be configured to create a second application as a second template based on a user's daemon-method execution request. For example, when the daemon-method execution request of the second template from the user is present, the batch application adding device 251 may be configured to receive the second template through the application template inquiring device 235. For example, the batch application adding device 251 may create the second application capable of being temporarily executed in the container orchestration 100 through the received second template. The batch application adding device 251 may be configured to store the second application in the batch application information storage device 214.

The batch application modifying device 252 may be configured to modify information about the batch application stored in the batch application information storage device 214. For example, the batch application modifying device 252 may be configured to modify information about the second template.

The batch application deleting device 253 may be configured to delete information about the batch application from the batch application information storage device 214. For example, when information about the second application is deleted, the batch application executing device 254 may stop executing and deploying the second application.

The batch application executing device 254 may be configured to execute, deploy, and interrupt the batch application stored in the batch application information storage device 214. For example, the batch application executing device 254 may be configured to temporarily execute, deploy, and interrupt the second application. For example, the batch application executing device 254 may be configured to transmit information about the second application to the container orchestration managing device 260. For example, the information about the second application may include information about the second template. The container orchestration managing device 260 may be configured to temporarily execute, deploy, and interrupt the second application through the container orchestration 100 based on the information about the second application. Detailed descriptions of a process in which the container orchestration managing device 260 executes, deploys, and interrupt the second application will be described later with reference to FIG. 7.

The batch application inquiring device 255 may inquire about batch application-related information and may update and output an execution status. For example, the batch application inquiring device 255 may inquire second application-related information from the batch application information storage device 214. For example, the batch application inquiring device 255 may inquire the execution status of the second application. For example, when the execution status of the batch application is not 'not running', the batch application inquiring device 255 may receive the execution status from the container orchestration managing device 260 and may update the execution status in the batch application information storage device 214. For example, the batch application inquiring device 255 may inquire that the execution status of the second application is 'running', from the batch application information storage device 214. For example, when the batch application inquiring device 255 receives the execution status of 'error' from the container orchestration managing device 260, the batch application inquiring device 255 may change the execution status into 'error' and may store the execution status of 'error' in the batch application information storage device 214. For example, when the execution status is the same, the batch application inquiring device 255 may not perform an update operation. For example, the batch application inquiring device 255 may output the execution status received from the container orchestration managing device 260. For example, the batch application inquiring device 255 may output the execution status to the user based on the user's request.

Figure 7:
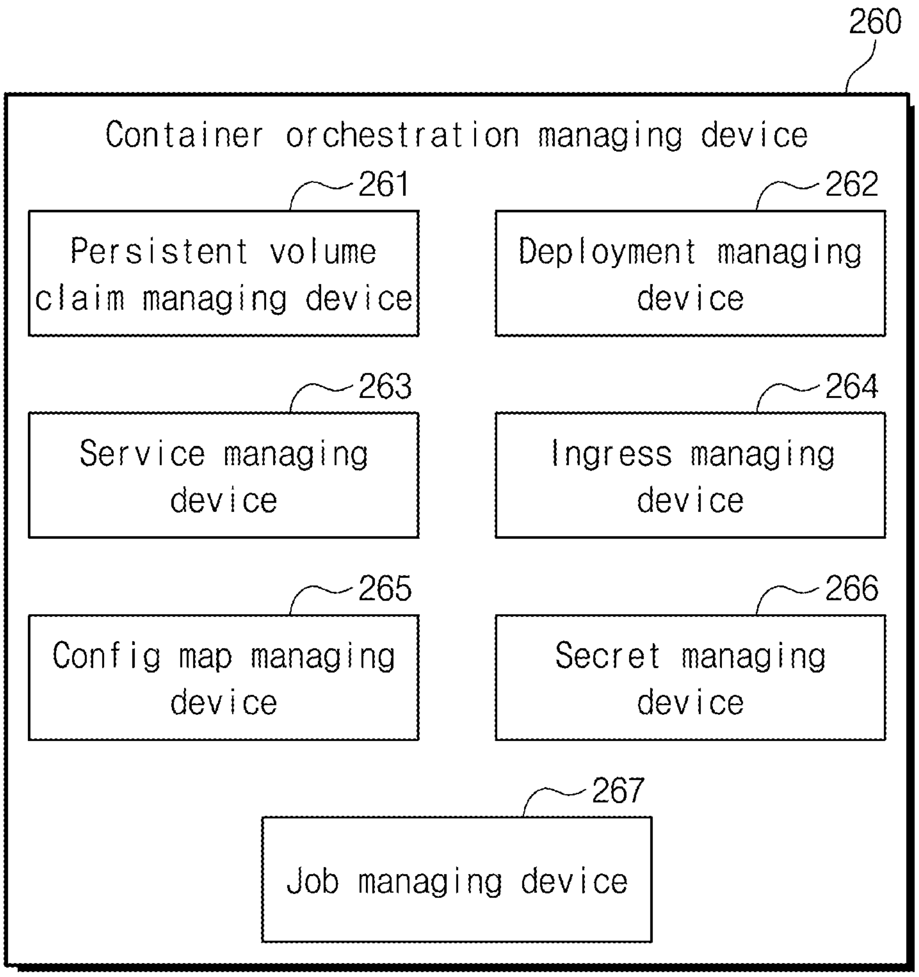
FIG. 7 is a diagram illustrating a container orchestration managing device, which is a configuration of a container orchestration management device, according to an embodiment of the present disclosure.

FIG. 7 is a diagram illustrating the container orchestration managing device 260, which is a configuration of the container orchestration management device 200, according to an embodiment of the present disclosure. Hereinafter, this will be described with reference to FIGS. 1, 5, and 6.

The container orchestration managing device 260 may be configured to receive an application and to deploy the application through the container orchestration 100. For example, the container orchestration managing device 260 may receive information about a daemon application from the daemon application managing device 240 such that a daemon application running continuously in the container orchestration 100. For example, the container orchestration managing device 260 may receive information about a batch application from the batch application managing device 250 such that a batch application running temporarily in the container orchestration 100.

The container orchestration managing device 260 may include a persistent volume claim managing device 261, a deployment managing device 262, a service managing device 263, an ingress managing device 264, a config map managing device 265, a secret managing device 266, and a job managing device 267.

For example, when the daemon application executing device 244 executes a first application, the container orchestration managing device 260 may receive information about the first application and may continuously execute the first application through the container orchestration 100.

For example, when the information about the first application includes volume mount information, the daemon application executing device 244 may transmit an application's name, namespace, persistent volume claim, volume level, mount path, or the like to the persistent volume claim managing device 261. The persistent volume claim managing device 261 may create a persistent volume claim on the container orchestration 100 from the application's name, namespace, persistent volume claim, volume level, mount path, or the like.

For example, the daemon application executing device 244 may transmit the application's name, namespace, execution request computing resources, execution-limited computing resources, execution commands, and arguments from the information about the first application to the deployment managing device 262. The deployment managing device 262 may create "deployment" on the container orchestration 100 from the application's name, namespace, execution request computing resources, execution-limited computing resources, execution commands, and arguments.

For example, when the information about the first application includes a service port, the daemon application executing device 244 may transmit the application's name, namespace, port value, protocol, or the like to the service managing device 263. The service managing device 263 may create a service on the container orchestration 100 from the application's name, namespace, port value, or protocol.

For example, when the service port has an ingress address, the daemon application executing device 244 may transmit the ingress address to the ingress managing device 264. The ingress managing device 264 may create ingress on the container orchestration 100 such that the service port is linked to the ingress. For example, when the first application is running and has the linked ingress, the daemon application access device 246 may be configured to output a URL that is accessible by an external user over the network.

For example, when the environment variables are required for the execution of the first application, the daemon application executing device 244 may transmit the environment variables to the config map managing device 265 and the secret managing device 266. The config map managing device 265 and the secret managing device 266 may create "Config map" and "Secret" from the environment variables on the container orchestration 100.

For example, the daemon application executing device 244 may be configured to stop the execution and deployment of the first application based on a stop request of a user. For example, the daemon application executing device 244 may transmit, to the container orchestration managing device 260, a request to stop the first application. Each of configurations of the container orchestration managing device 260 may be configured to delete objects created on the container orchestration 100 based on a request to stop the first application.

For example, when the batch application executing device 254 executes a second application, the container orchestration managing device 260 may receive information about the second application and may temporarily execute the second application through the container orchestration 100.

For example, when the information about the second application includes volume mount information, the batch application executing device 254 may transmit an application's name, namespace, persistent volume claim, volume level, mount path, or the like to the persistent volume claim managing device 261. The persistent volume claim managing device 261 may create a persistent volume claim on the container orchestration 100 from the application's name, namespace, persistent volume claim, volume level, mount path, or the like.

For example, the batch application executing device 254 may transmit the application's name, namespace, execution request computing resources, execution-limited computing resources, execution commands, and arguments from the information about the second application to the job managing device 267. The job managing device 267 may create "job" on the container orchestration 100 from the application's name, namespace, execution request computing resources, execution-limited computing resources, execution commands, and arguments.

For example, when the environment variables are required for the execution of the second application, the batch application executing device 254 may transmit the environment variables to the config map managing device 265 and the secret managing device 266. The config map managing device 265 and the secret managing device 266 may create "Config map" and "Secret" from the environment variables on the container orchestration 100.

For example, the batch application executing device 254 may be configured to stop the execution and deployment of the second application based on a stop request of the user. For example, the batch application executing device 254 may transmit, to the container orchestration managing device 260, a request to stop the second application. Each of configurations of the container orchestration managing device 260 may be configured to delete objects created on the container orchestration 100 based on a request to stop the second application.

Figure 8:
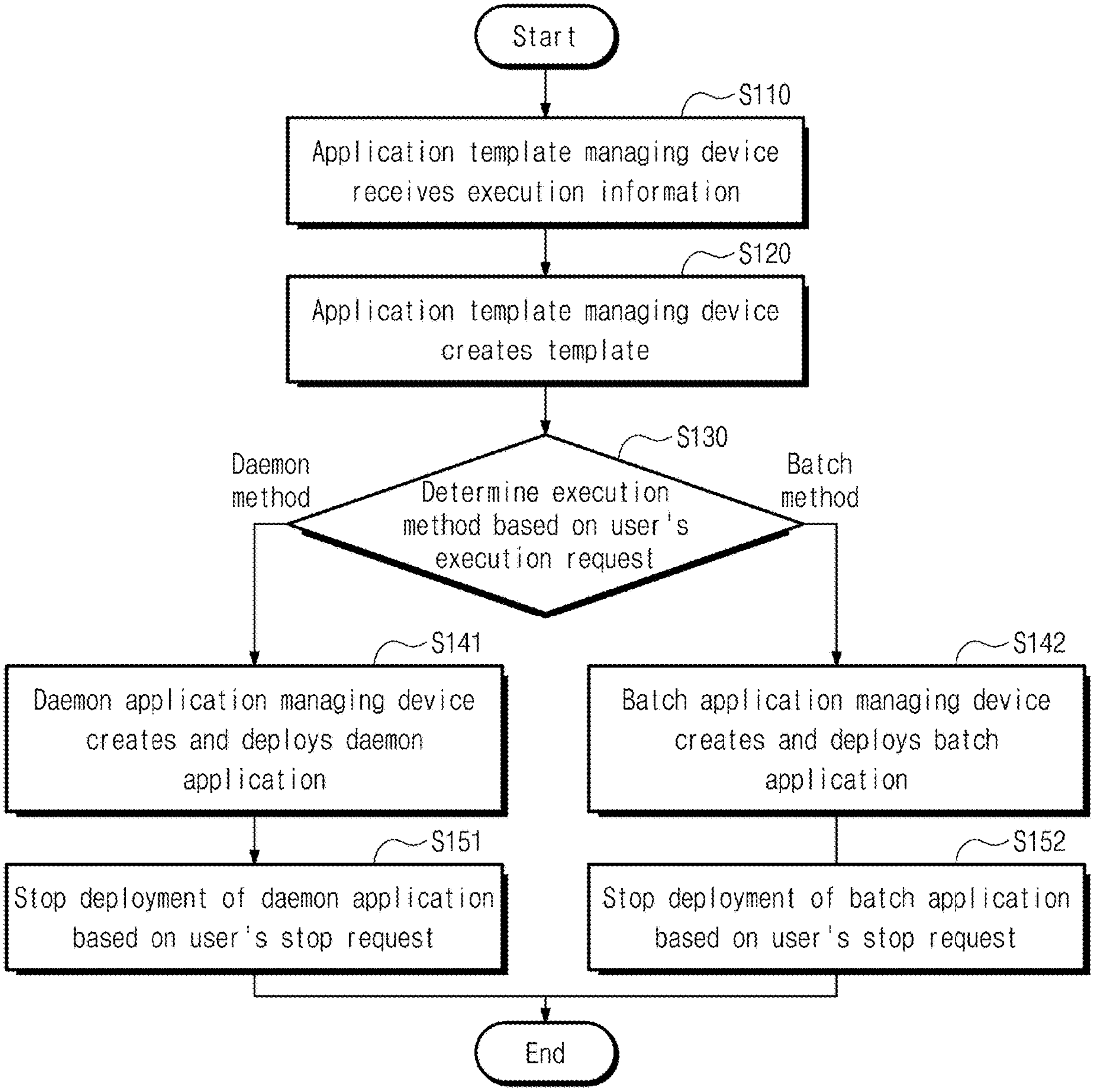
FIG. 8 is a flowchart illustrating a method, in which a container orchestration management device creates a template based on execution information and deploys an application, according to an embodiment of the present disclosure.

FIG. 8 is a flowchart illustrating a method, in which a container orchestration management device creates a template based on execution information and deploys an application, according to an embodiment of the present disclosure. Hereinafter, the description will be given with reference to FIG. 1.

As in the operation of the container orchestration management device 200 described above with reference to FIGS. 1 to 7, in each operation, devices included in the container orchestration management device 200 may be configured to perform operations similar to those described above.

In operation S110, the application template managing device 230 may receive execution information from a user. For example, the container orchestration management device 200 may receive the execution information from the user and may deliver the execution information to the application template managing device 230.

In operation S120, the application template managing device 230 may create a template. For example, the application template managing device 230 may create the template based on the execution information.

In operation S130, the container orchestration management device 200 may determine the execution method of an application based on the user's execution request. For example, the container orchestration management device 200 may provide the execution request to the daemon application managing device 240 based on determining that the execution method of the user's execution request is a daemon method. For example, the container orchestration management device 200 may provide the execution request to the batch application managing device 250 based on determining that the execution method of the user's execution request is a batch method.

In operation S141, the daemon application managing device 240 may create, continuously execute, and deploy the daemon application through the template based on determining that the execution method of the application is the daemon method.

In operation S151, the daemon application managing device 240 may stop the execution and deployment of the daemon application based on the user's application stop request.

In operation S142, the batch application managing device 250 may create, temporarily execute, and deploy the batch application through the template based on determining that the execution method of the application is the batch method.

As another example, when the execution request includes both the daemon method and the batch method, operations S141 and S142 may be performed at the same time. For example, there may be a plurality of execution requests in operation S130 based on the first template generated in operation S120. For example, in operation S130, the container orchestration management device 200 may receive a first daemon application execution request, a second daemon application execution request, a first batch application execution request, and a second batch application execution request based on the first template. The container orchestration management device 200 may provide the daemon application managing device 240 with the first daemon application execution request and the second daemon application execution request, and may provide the batch application managing device 250 with the first batch application execution request and the second batch application execution request. In operation S141, the daemon application managing device 240 may create, continuously execute, and deploy the first daemon application and the second daemon application through the first template. In operation S142, the batch application managing device 250 may create, temporarily execute, and deploy the first batch application and the second batch application through the first template. For example, the creation, execution, and deployment of each of the first daemon application, the second daemon application, the first batch application, and the second batch application may be performed in parallel.

In operation S152, the batch application managing device 250 may stop the execution and deployment of the batch application based on the user's application stop request.

For another example, the execution and deployment of the batch application may be stopped before the user's request to stop an application. For example, a batch application may be executed with an end time point. For example, the batch application may be collectively executed depending on the set time or condition. When the batch application satisfies the specified time or condition, the batch application managing device 250 may stop the execution and deployment of the batch application. For example, when the specified time or condition is satisfied before the user's application stop request, the batch application managing device 250 may stop the execution and deployment of the batch application.

As described above, a container orchestration management device may create templates through execution information including container images, computing resources, environment variables, execution commands, arguments, service ports, and the like required to deploy applications, may perform management such as adding, modifying, and deleting the templates, and may deploy and manage the applications running through the templates in a daemon or batch method through container orchestration.

Through the container orchestration management device of the present disclosure, it is possible to define execution information of an application in a new form called a template, to easily share such the template, and to divide and execute the application in a daemon method and a batch method.

As used in this specification, the terms "device" or "unit" refer to any combination of software, firmware, and/or hardware configured to provide the functionality described in this specification. For example, the software may be implemented as a software package, codes and/or set of instructions, or instructions. For example, the hardware may include a single or any combination or assembly of firmware storing instructions executed by a hardwired circuit, a programmable circuit, a state machine circuit, and/or a programmable circuit.

The above description refers to detailed embodiments for implementing the present disclosure. The present disclosure may include embodiments in which a design is changed simply or which are easily changed, as well as the embodiments described above. In addition, technologies that are easily changed and implemented by using the above embodiments may be included in the present disclosure. Accordingly, it will be apparent to those of ordinary skill in the art that various changes and modifications may be made to the above embodiments without departing from the spirit and scope of the present disclosure as set forth in the following claims.

A container orchestration management device may create templates through execution information including container images, computing resources, environment variables, execution commands, arguments, service ports, and the like required to deploy applications, may perform management such as adding, modifying, and deleting the templates, and may deploy and manage the applications running through the templates in a daemon or batch method through container orchestration.

Through the container orchestration management device of the present disclosure, it is possible to define execution information of an application in a new form called a template, to easily share such the template, and to divide and execute the application in a daemon method and a batch method.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A container orchestration management device comprising:

an application template managing device configured to create first execution information including a container image, a computing resource, an environment variable, an execution command, an argument, and a service port, which are required for deployment of a first application, as a first template based on a request signal of a first user including the first execution information, to create second execution information including a container image, an environment variable, an execution command, an argument, and a service port, which are required for deployment of a second application, as a second template based on a request signal of the first user including the second execution information, and to manage the first template and the second template;

a daemon application managing device configured to create the first application through container orchestration, to continuously execute the first application, and to deploy and manage the first application, based on the first template; and a batch application managing device configured to create the second application through the container orchestration, to temporarily execute the second application, to deploy the second application, and to manage the second application, based on the second template.

2. The container orchestration management device of claim 1, further comprising:

a data storage device configured to store information related to the application template managing device, the daemon application managing device, and the batch application managing device, and first user information including an ID, a password, a name, and an email address of the first user.

3. The container orchestration management device of claim 2, further comprising:

a system user managing device configured to:

add second user information including a second access permission of a second user, and a ID, a password, a name, and an email address of the second user to the data storage device;

manage the first user information and the second user information stored in the data storage device; and determine validity of the second access permission based on a request signal of the second user.

4. The container orchestration management device of claim 1, further comprising:

a container orchestration managing device configured to:

identify an execution status of the first application and an execution status of the second application from the container orchestration; and execute, deploy, and manage the first application and the second application through the container orchestration based on request signals of the daemon application managing device and the batch application managing device.

5. The container orchestration management device of claim 3, wherein the data storage device includes:

a system user storage device configured to store the first user information, the second user information, an access permission of the first user, and the access permission of the second user;

an application template information storage device configured to store template information including names, descriptions, and computing resources for the first template and the second template;

a daemon application information storage device configured to store first application information including a name, a description, and an operating status of the first application; and a batch application information storage device configured to store second application information including a name, a description, and an operating status of the second application.

6. The container orchestration management device of claim 3, wherein the system user managing device includes:

a user adding device configured to add the second access permission and the second user information to the data storage device;

a user modifying device configured to modify the second user information;

a user deleting device configured to delete the second access permission and the second user information from the data storage device; and a user inquiring device configured to determine validity of the second access permission based on a request of the second user.

7. The container orchestration management device of claim 3, wherein the application template managing device includes:

an application template adding device configured to create the first template and the second template based on a request signal of the first user;

an application template modifying device configured to modify the first execution information and the second execution information of the first template and the second template;

an application template deleting device configured to delete the first template or the second template from the data storage device;

an application template publicizing device configured to publicize the first template to the second user; and an application template inquiring device configured to output the first template based on an access request of the second user for the first template.

8. The container orchestration management device of claim 4, wherein the daemon application managing device includes:

a daemon application adding device configured to create the first application based on the first template;

a daemon application modifying device configured to modify the first application;

a daemon application deleting device configured to delete the first application;

a daemon application inquiring device configured to receive the execution status of the first application from the container orchestration managing device and to output the execution status of the first application;

a daemon application executing device configured to create, continuously execute, and deploy the first application through the container orchestration managing device; and a daemon application access device configured to allow a third user to access the first application.

9. The container orchestration management device of claim 4, wherein the batch application managing device includes:

a batch application adding device configured to create the second application based on the second template;

a batch application modifying device configured to modify the second application;

a batch application deleting device configured to delete the second application;

a batch application inquiring device configured to receive the execution status of the second application from the container orchestration managing device and to output the execution status of the second application; and a batch application executing device configured to create, temporarily execute, and deploy the second application through the container orchestration managing device.

10. A container orchestration managing method of a container orchestration management device including an application template managing device, a daemon application managing device, and a batch application managing device, the method comprising:

receiving, by the application template managing device, execution information including a container image, an environment variable, an execution command, an argument, and a service port, which are required for deployment of an application;

creating, by the application template managing device, a template based on the execution information;

determining, by the container orchestration management device, an execution method of the application based on a user execution request;

creating, continuously executing, and deploying, by the daemon application managing device, the application through the template based on determining that the execution method of the application is a daemon method; and creating, temporarily executing, and deploying, by the batch application managing device, the application through the template based on determining that the execution method of the application is a batch method.

11. The method of claim 10, further comprising:

stopping, by the daemon application managing device, the deployment of the application based on a request of the user to stop the application.

* * * * *